United States Patent [19]
Vygovsky et al.

[11] Patent Number: 5,800,895
[45] Date of Patent: Sep. 1, 1998

[54] BERYLLIUM MEMORY DISK SUBSTRATE FOR COMPUTER HARD DISK DRIVE AND PROCESS FOR MAKING

[76] Inventors: Eugene V. Vygovsky, 4-2/44 Valovaya Str. Apt. 10, Moscow, Russian Federation, 113054; Larry A. Grant, 1600 Saratoga Ave. #403-250, San Jose, Calif. 95129; Wayne L. Wright, 3901 Country Club Rd., Winston Salem, N.C. 27104; Alexander Markovsky, 134 E. Partridge La., Cherry Hill, N.J. 08003; Yuri V. Berestovsky, 134 15 Petrov Str., Apt 12, Saratov, Russian Federation, 1410035; Igor V. Milov, 27 Kolomenskaya Str., Apt 386, Moscow, Russian Federation, 113054

[21] Appl. No.: 693,787

[22] Filed: Aug. 9, 1996

[51] Int. Cl.[6] .................... B32B 3/00; B24B 1/00
[52] U.S. Cl. ............... 428/64.1; 428/64.2; 428/64.3; 428/64.4; 428/457; 428/913; 369/288; 51/309; 216/88; 216/89; 451/57; 451/287
[58] Field of Search ................... 428/64.1, 64.2, 428/64.3, 64.4, 457, 913; 369/288; 216/88, 89; 51/309; 451/57, 287

[56] References Cited

U.S. PATENT DOCUMENTS

| | | | |
|---|---|---|---|
| 4,707,431 | 11/1987 | Umehara | 430/271 |
| 4,956,216 | 9/1990 | Hausler et al. | 428/64 |
| 5,260,847 | 11/1993 | Bashore et al. | 360/106 |
| 5,417,778 | 5/1995 | Nachtrab et al. | 148/400 |
| 5,421,916 | 6/1995 | Nachtrab et al. | 148/400 |

*Primary Examiner*—Elizabeth Evans
*Attorney, Agent, or Firm*—George M. Steres

[57] ABSTRACT

A Beryllium disk drive substrate is prepared using a Beryllium metal having a starting modulus of elasticity (stiffness) of about 4.2 times that of Aluminum, in which the beryllium is separated into circular disks and processed by a sequence of lapping, heat-treating under pressure, cooling under pressure and polishing steps which retains the desirable metallurgical characteristics of the starting metal and provides sufficiently high quality surface finish, thermal conductivity and low mass density, to enable improved rotational speeds, acceleration/deceleration rates and information packing density for demanding disk drive applications.

20 Claims, 1 Drawing Sheet

BERYLLIUM MEMORY DISK SUBSTRATE FOR COMPUTER HARD DISK DRIVE AND PROCESS FOR MAKING

BACKGROUND OF THE INVENTION

1. Field of the Invention

The invention relates to a memory disk substrate for computer hard disk drives and a method for making the same. More specifically the invention is related to substrate disks made of Beryllium having an high modulus of elasticity. The disks are processed to relieve residual stress without losing other desirable metallurgical properties.

2. Previous Art

The overwhelming majority of hard or rigid disk drives are made with substrates of Aluminum and/or Aluminum alloys. The low cost of Aluminum and processing steps used to prepare Aluminum disk substrates are eminently suitable for the low cost mass volume market for today's disk drives.

Bashore et al. in U.S. Pat. No. 5,260,847 (the '847 patent) describes a rigid disk drive (FIG. 2) for a computer. FIG. 3 of Bashore shows a plurality of stacked disks 12 mounted to a central hub 14. The hub 14 and disks are coupled to a motor (not shown) which rotates the disks 12. The disks 12 are spaced apart and between corresponding suspensions 26 and transducers 28 connected to a armset 20 of an actuator 21. The transducers 28 are electrically coupled (not shown) to electronics for writing and reading information stored on respective surfaces of the disks 12.

Market forces impel an improvement in memory storage performance. It has been natural to look to advances using Aluminum substrates in response to these demands. Increased rotational speed, lighter weight (thinner) disks are some of the solutions.

Aluminum disks are practically limited to less than about 8,000 RPM. Faster speed is restricted due to internal flow of material resulting in "drifting" of information sector which is interpreted as a catastrophic failure. Also the relatively low stiffness of Aluminum means higher speeds are accompanied by vibration or flutter induced by rapid acceleration/deceleration and high rotational speeds and requires a lower information density on the disk to avoid catastrophic failure of information transfer. Aluminum disk substrates limitations on acceleration and deceleration rates limit decreases in access time and increases in information density.

Due to the low melting temperature of Aluminum, the coefficient of thermal conductivity is much more temperature dependent than Beryllium. This results in special precautions (usually expensive) in a disk drive which must operate over wide temperature ranges; eg. from an Arizona summer to a Minnesota winter which may be required for a satellite orientation device in an automobile.

The relatively low stiffness (material strength) of an Aluminum substrate requires a relatively high thickness and mass, resulting in higher motor power, higher temperature losses and thicker spindle diameter. Thicker spindles decrease the available space for information storage on the disk surface. Decreased active space requires larger diameter for fixed memory size, leading to higher material cost and bulky form factor. Thicker spindles also require bigger bearings which limits the achievable rotational speed due to higher losses.

The relatively low stiffness of Aluminum also tends to cause additional energy loss due to coupling of energy between the other Aluminum components of the disk drive system and the disk. The disk acts as a resonant element whose resonant frequency is primarily dependent on the stiffness coefficient. Since that is relatively low and is closely matched to the rest of the mechanical system, energy is coupled from the rest of the system to the disk, resulting in increased losses as the rotational speed and acceleration rates are increased.

Decreased power and improvements in memory size, access time and temperature range are especially important in the portable computer market. Aluminum disk substrates thus have several disadvantages in responding to these conflicting requirements.

Due to the increased performance demands dictated by the unrelenting change in price-performance points of the computer market, particularly in the portable computer market, it is necessary to increase rotational speed, decrease spindle power and to increase memory density for rigid disk drives. The characteristics of Aluminum disk substrates are becoming and will continue to be a limiting factor in price-performance improvement.

Attempts have been made to use glass coatings on Aluminum to improve performance. However thermal expansion mismatch and low conductivity of glass inhibits the operating temperature range and economical lapping of such substrates.

Other materials have been researched (Beryllium, glass, Carbon, SiC, and the like, but none previously have been found to meet the technical and economical requirements of the market.

Beryllium particularly has characteristics which potentially provide advantages as a substrate when substituted for Aluminum, ie. lower density, (eg. about 1.84 vs 2.7 gram/cubic centimeter), higher modulus of elasticity or stiffness (about 303 vs 71 Giga-pascals (Gpa)), lower thermal coefficient of expansion (about 11.4 vs 24.2 ppm/°C.) and higher coefficient of thermal conductivity (about 216 vs 118 Watt/meter-°Kelvin). The high stiffness of Beryllium is particularly attractive for high speed and acceleration rates required for future disk drives.

Beryllium of different grades and alloys are available. Beryllium can be obtained in hyper-pure, ie. >99.9% purity (and very expensive) form, in ingot form of high purity or in a commercial grade of more reasonable cost. The commercial grade of Beryllium is referred to as "commercially pure" and designated as S-65 in the United States of America. In Russia, the commercial grade of Beryllium is termed "ceramic Beryllium" and designated HP-56. In both cases, this terminology refers to Beryllium of about 98% or better purity containing up to about 2% Beryllium Oxide (BeO). Commercially pure Beryllium consists of essentially pure Beryllium with a small amount of Beryllium Oxide (BeO), typically from about 0.1–0.2% to about 2%. The amount of BeO depends on the method of manufacture.

Commercially pure Beryllium is prepared by a sintering or hot pressed block process applied to a pure Beryllium powder which yields a metallurgical structure having other desirable metallurgical properties of elongation, ductility, yield strength, polishing characteristics and the like. Sintering avoids the disadvantageous brittle characteristic of ingot and hyper-pure Beryllium which make them unsuitable for use as disk substrates.

The powder used for sintered Beryllium can be obtained by crushing or atomizing. Beryllium metal prepared from crushed powder contains about 2% BeO and that prepared from atomized powder contains about 0.1–0.2% BeO. Both sintered materials have the desired higher stiffness coefficient and the other desirable metallurgical properties.

Beryllium made from sintered powder is available from Brush-Wellman, Cleveland, Ohio, Kompozite, in Moscow, Russia and ULBA Metallurgical Institute in Ust-Kamemogorzk, Kazakhstan.

Previous efforts to use Beryllium have not been successful for several reasons. Beryllium from cast or ingot form exhibits nearly a mono-crystalline metallurgical structure which tends to be brittle. This is unsuitable for the conditions of high mechanical stress experienced by disk drive substrates. Commercially pure Beryllium is a material that exhibits much better machinability and other characteristics than very pure cast or ingot form.

It is known to use sawing, such as diamond blade or wire sawing to separate Beryllium rod into raw slices or disks. Sawing introduces too much damage to the surfaces of the raw disks to use them directly as disk substrates. Lapping has been used to remove the uneven and rough surface profile remaining after sawing, ie. non-uniform thickness across the disk surface and undulating thickness profile. Lapping of sawn raw disks is unavoidable to achieve the necessary surface uniformity required for high performance rigid disk substrates.

Beryllium, however, exhibits a visco-elastic behavior that has an undesirable side-effect following lapping (or sawing). A visco-elastic material, upon application of sufficient stress, such as that occurring during sawing or lapping, leaves residual stress in a thin, strained layer adjacent to the lapped surface.

The amount of residual stress remaining in the strained layer after lapping is an increasing function of the amount of material removed. The functional relationship can be modeled approximately as a power function:

$$stress = K(\Delta T^n)$$

where K is a proportionality constant, $\Delta T$, is the amount (thickness) of material removed and n is an exponent between 1 and 2. The residual stress begins to accumulate more and more rapidly as increasing amounts of material are removed from the surface. For thin disks, eg from less than about 0.26 to about at least 0.8 mm, if more than about 1.5 microns of material is removed, this residual stress can cause the lapped disk to take on a bowl shape which is distorted sufficiently that the disk would be unusable for a high performance disk drive substrate.

Lapping only about 1.5 microns of material from the sawn disk surfaces is not sufficient to reduce the thickness of the disk such that polishing can be done. A sawing tolerance of about 0.1 mm (100 microns) depending on the sawing equipment and final customer requirements must be added to the end thickness desired. Thus lapping Beryllium disks by at least the sawing tolerance to achieve the desired flatness leaves an unacceptably warped substrate. Even lapping disks on both sides to try to balance the opposing residual stresses has not been successful, since the amount of material removed from either side is never exactly equal or uniform.

Polishing, by itself, to remove damaged material due to sawing or lapping, of such lapped Beryllium disks has not provided the necessary combination of quality and economy required for high volume production of rigid disk substrates. The polishing process is relatively much slower than lapping and thus would not be an acceptable substitute for lapping due to the time and cost required to remove the material left by the sawing tolerance. Polishing, however, may be needed in addition to the lapping step.

Several methods to relieve the residual stress induced by lapping have been tried. Placing the lapped disks on a heavy, vibrating plate, in an attempt to redistribute the crystalline structure between the strained layers and unstrained layers, ie. the bulk, thereby relieving the stress, has not yielded satisfactory results. Exposing a stack of the lapped disks to extremely high compressive stress by squeezing between two parallel plates is not useful because the amount of compression required causes diffusion welding between the surfaces of the adjacent disks.

Thermal annealing (ie. heating to a high temperature for a long time) has also not previously been successful. Thermal annealing is typically done in a heated furnace at atmospheric pressure. The material to be annealed, Beryllium substrates in this case, are placed in the furnace at a desired temperature, and heated for a predetermined period of time, until the desired effect is achieved. The substrates are then removed and cooled to about room temperature, and processed further or used as is.

Stress relief by thermal annealing has not been successful due to the loss of some of the desirable characteristics, eg, elongation, ductility, yield strength, ease of polishing and the like at higher temperature, specifically above about 900 C.

In any event, the other desirable properties of elongation, ductility, yield strength, polishing characteristics and the like are lost if the metal is heated beyond about 900 C. To retain the preferred properties in lapped Beryllium substrates, the previous thermal annealing of the substrates has to be so limited (ie. less than about 900 C.) that residual stress relief does not occur or the annealing time is so long, that the processing cost makes the use of annealed Beryllium substrates impractical for rigid disk substrates.

It would be an advantage to have a memory disk substrate capable of rotating at higher angular speeds with less distortion, flutter, vibration and higher thermal conductivity than that obtainable from Aluminum substrates.

It would be an advantage to have a disk substrate capable of higher information densities at a given rotational speed and tolerant of increased acceleration/deceleration rates.

It would be also be an advantage to provide a process for decreasing the residual lapping stresses in lapped Beryllium disks such that the distortion of the disks was so small that economical polishing techniques could be used to prepare them as a rigid disk substrates.

SUMMARY OF THE INVENTION

It is an object of the invention to provide a rigid disk substrate which has lower distortion, flutter, vibration and higher thermal conductivity than that obtainable from Aluminum substrates of equivalent dimension.

It is another object of the invention to provide a disk capable of higher information densities at a given diameter and rotational speed.

It is also an object of this invention to provide a disk substrate of lighter mass with equal or better tolerance to increased acceleration/deceleration and rotation rates. It is another object of this invention to provide a process for treating lapped Beryllium disks to remove distortion induced by residual lapping stresses.

The heat-treated beryllium rigid disk substrate of the present invention provides an economic price-performance characteristic that make it a competitive contender for the high performance disk drive market.

Beryllium, with its higher stiffness modulus, allows designers to produce a disk substrate that is thinner than what is currently offered in aluminum. This allows design of a system that contains more disks in a given volume (ie more memory density).

Beryllium's lower density enables designers to reduce the moment of inertia of the drive which results in longer battery life in portable computer equipment and lower wear (longer life, lower warranty expense) of other components. In addition, with the lower moment of inertia and higher stiffness, the RPM spin rate can be increased for faster access times. Also, with the lower density (lighter weight) the hub hole and hub size can be reduced providing higher information packing density, lower motor power, longer battery life (for portable computers) and less thermal dissipation.

In one embodiment of the process for treating Beryllium for preparing high performance rigid disk substrates in accordance with this invention, the process includes the steps of first obtaining a plurality of raw disks comprised of commercially pure Beryllium, the disks having a stiffness about 4.2 times that of Aluminum. Each disk defines respective opposed surfaces and a central axis therethrough.

The raw disks are obtained with a desired diameter, D, and an initial thickness, $T_o$, between the surfaces. The initial thickness, $T_o$, is selected to be greater than a final desired thickness, T, by at least an amount, $2\Delta T$, allowing for a sufficient manufacturing tolerance for a process step of preparing the disks prior to the lapping process step.

Both surfaces of each of the disks are lapped. The lapping process is terminated after removal of a thickness of at least $2\Delta T$.

The lapped disks are placed between the opposed surfaces of two opposed pressure plates. The surfaces of the disks are held in contact with the respective opposed surfaces of the two plates. The plates are composed of substantially pure Beryllium, containing essentially no BeO.

The plates are forced together such that the disks are compressed with a predetermined pressure, and held with the plates in contact in compressive relationship at the predetermined pressure in a heated environment. The disks are heated to a predetermined elevated temperature and maintained for a predetermined time period. The temperature and time are such that the lapping induced stress adjacent to the surfaces of the disks decay to a level such that the distortion of the disks after cooling is essentially zero. The time-temperature product is limited such that the other desirable metallurgical characteristics of the disks after cooling remain essentially undisturbed.

The lapped disks are then cooled while under pressure to essentially room temperature.

A preferred method for obtaining the disks is by sawing or slicing from a rod of commercially pure Beryllium.

A polishing step and/or a coating step may follow the step of cooling the disks under pressure.

BRIEF DESCRIPTION OF THE DRAWINGS

For a further understanding of the objects and advantages of the present invention, reference should be had to the following detailed description, taken in conjunction with the accompanying drawings, in which like parts are given like reference numerals and wherein.

DETAILED DESCRIPTION OF A PREFERRED EMBODIMENT OF THE INVENTION

In accordance with the present invention, retaining the desirable characteristics, eg, elongation, ductility, yield strength, ease of polishing and the like of Beryllium while providing the necessary flatness and surface finish for use as a rigid disk substrate, requires that the Beryllium first be obtained in slice or disk form. Cylindrical rod stock of the desired diameter, eg 95 mm (3.5 in.), 65 mm (2.5 in.) and 48 mm (1.8 in.) may be separated into slices or raw disks of initial thickness, $T_o$, by one of several known processes.

Sawing Beryllium with diamond impregnated blades or wire sawing with a electrolyte solution are known commercial processes. Diamond sawing is suitable for thick substrates where the substrate thickness is much greater than the saw thickness. The loss of the material sawn (the kerf, which is at least as thick as the diamond blade makes it somewhat uneconomical for a high cost material such as Beryllium if the substrates are thin compared to the saw blade.

Wire sawing is more preferable when the desired Beryllium substrate is thin, ie 0.84 or 0.5 mm for 95 mm and 65 mm substrates, and 0.36 or 0.26 mm for 48 mm substrates since the wires may be very thin. Wire sawing is also more preferable since many wires may be ganged in one mechanism to saw a whole rod in one operation.

Materials and techniques for sawing Beryllium rod into raw disks or slices is available from Brush-Wellman, Cleveland, Ohio, or Kompozite of Moscow, Russia.

It is contemplated that sheet Beryllium of desired initial thickness, may be cut into raw disks prior to lapping by using super-high-pressure water blast or laser cutting.

Figure 1:
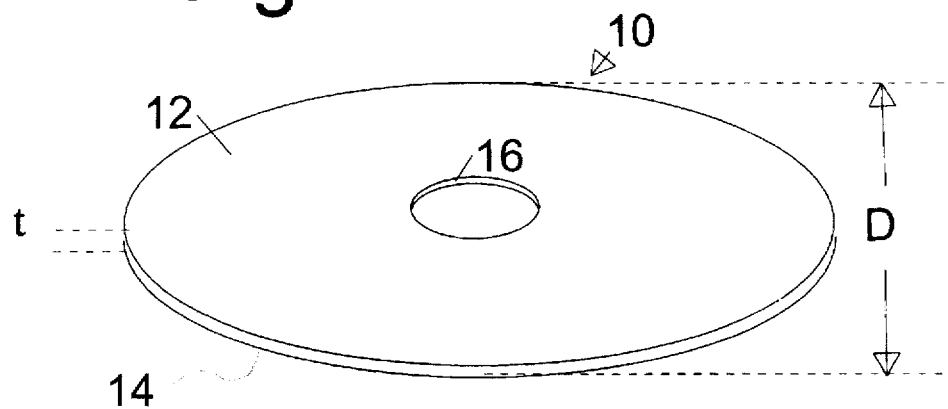
FIG. 1 illustrates an exemplary Beryllium substrate disk.

With reference to FIG. 1, a Beryllium disk 10 having a diameter, D, is shown having two opposed surfaces 12, 14 and a central aperture 16 for mounting to a hub (not shown) of a disk drive stack for mounting in a rigid disk drive. The process for making the aperture 16 may be a suitable conventional process and does not form part of the present invention. The aperture 16 may be omitted in cases where only one disk 10 is to be mounted to a hub assembly (not shown).

After separation, the sawn disks 10 are lapped using conventional lapping equipment to remove about 1.5 micron of material from both sides 12, 14 of the disks. Commercial lapping compounds mixed with diamond micropowder are suitable for decreasing the surface roughness to about 500 to 900 Angstroms prior to final polishing. A lapping compound having lapping characteristics similar to NALCO 2350 with a pH of about 8.0 to about 8.2 mixed in the ratio of about 2:1 with diamond micropowder is suitable.

The sawn disks 10 are lapped to remove at least a sawing tolerance thickness, $2\Delta T$, to achieve the final desired thickness, T,. The lapping time to remove tolerance thickness $2\Delta T$ will vary with the particular equipment and conditions available, but may be adjusted by a skilled person by making simple tests of material removed versus lapping time.

The residual stress left in the Beryllium adjacent to the lapped surfaces 12, 14 increases evermore rapidly as more material is removed. Removing more than about 1.5 microns of Beryllium from the opposed sides 12, 14 of the lapped disk 10 leaves an amount of residual stresses adjacent to the lapped surfaces 12, 14 sufficient to distort the lapped substrates 10 into an unacceptable bowl shape. Polishing warped substrates 10 at this step would be unacceptable.

The next process step of the present invention relieves the residual stress and distortion remaining from the lapping step without significantly decreasing the desirable characteristics of the metallurgical structure of the disks 10.

Figure 2:
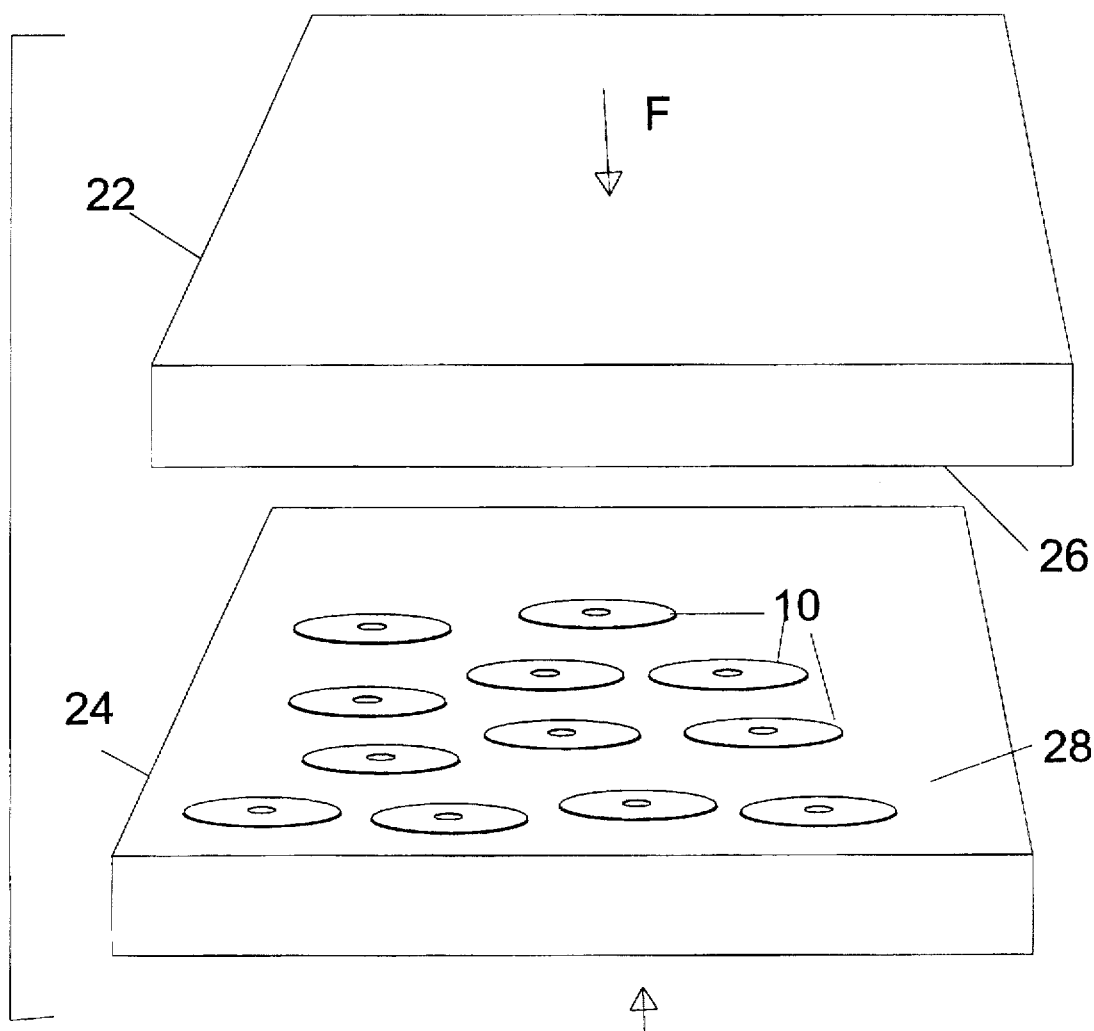
FIG. 2 depicts an exploded view of an assembly 20 used in the Beryllium disk heat treatment under pressure process step of an embodiment of the present invention.

With reference to FIG. 2, an assembly 20 includes a plurality of lapped Beryllium disks 10 from the previous process step and a pair of opposed pressure plates 22, 24. The disks 10 are placed between the opposed pressure plates 22, 24. Plates 22, 24 have respective inward facing pressure surfaces 26, 28. Opposed forces, F, are applied to plates 22, 24 forcing pressure surfaces 26, 28 in contact with the respective disk surfaces 12, 14. The surfaces 12, 14 of disks 10 are arranged to be pressed by the respective opposed plate surfaces 26, 28, by forcing the plates 22, 24 together with a force, F, with the disks 10 therebetween. The force, F, is selected to essentially flatten the disks 10, removing any bowl-shaped distortion.

In one embodiment of this invention, the plates 22, 24 are comprised of pure Beryllium having essentially no BeO. This composition avoids the diffusion welding between the plate surfaces 22, 24 and the disk surfaces 12, 14 which otherwise may occur at the next process step. The plates 22, 24 may be manufactured from Beryllium by machining and assembly methods known to practitioners skilled in the art of Beryllium fabrication. The force, F, is selected such that the disks 10 are essentially flattened and compressed to a preselected pressure, P1.

The assembly 20 of disks 10 and plates 22, 24 are then heated under pressure, P1, provided by plates 22, 24 to a temperature, T1, for a time, t1. The temperature, T1, is limited not to exceed a temperature, Tmax, at which sintered Beryllium loses the desirable characteristics of elongation, ductility, yield strength, and ease of polishing. Tmax has been experimentally determined to be about 900° C.

A heat treatment step under sufficient pressure will relieve the residual stress

TABLE I

| Temperature thickness °C. | time mins | diameter mm | mm |
|---|---|---|---|
| 650 | 240 | 48 | 0.36 |
| 850 | 30 | 48 | 0.36 | near the surfaces 12, 14 of the disks 10 sufficiently to provide essentially zero distortion in the disks 10 after cooling and removing the disks 10 from the assembly 20. The time, t1, and temperature, T1, necessary has been experimentally determined to be a function of the diameter, D, and the thickness, T, of the disks 10. The accompanying table shows the time and temperature required for a pressure, P1, of about 180 to 190 atmospheres to relieve the residual stress such that the lapped disks 10 have essentially zero distortion after cooling.

It has been experimentally observed and reasonably follows from the law of heat transfer by conductivity, that the heat treatment time is nearly proportional to the disk thickness.

The heat treatment step under pressure is followed by a step of cooling the assembly 20 with the disks 10 remaining under pressure until cooled to essentially room temperature.

The disks 10 are then removed from the assembly 20 and prepared for polishing, if necessary.

The final step of one embodiment of this invention is the step of polishing. The polishing step depends on the final use for the Beryllium disk 10. If the disk 10 is to be coated with a magnetic film directly, it is very important to polish the surfaces 12, 14 to about 10 to 30 Angstroms. If the substrate 10 is to be coated with an intermediate layer, such as Nickel, the polishing of the surfaces 12, 14 is less critical, and the surface finish provided by the lapping step will suffice; ie. about 500 to 900 Angstroms. The specific techniques for achieving the required surface finish after the heat treatment under pressure does not form part of this invention.

Other coatings may be applied to the surfaces 12, 14 to provide additional safety or product characteristics. Coating and plating techniques for applying other layers to the disk surfaces 12,14 such as spray coating, dip coating, spin coating, plating, sputtering, and evaporating are well known in the art.

While the foregoing detailed description has described several embodiments of the present invention, it is to be understood that the above description is illustrative only and not limiting of the disclosed invention. It will be appreciated that it would be possible to modify the size, shape and appearance and methods of manufacture of various elements of the invention or to include or exclude various processes steps within the scope and spirit of this invention. Thus the invention is to be limited only by the claims as set forth below.

What is claimed is:

1. A method for preparing high performance rigid disk substrates comprising:

obtaining a plurality of circular disks comprised of commercially pure Beryllium, the disks having a stiffness about 4.2 times that of Aluminum, each disk having respective opposed surfaces defining a central axis;

lapping both surfaces of each of the disks to remove at least about a predetermined tolerance of material;

placing the disks between the opposed surfaces of two opposed pressure plates, with the surfaces of the disks in contact with the respective opposed surfaces of two plates, the plates comprised of substantially pure Beryllium, the plates comprised of essentially no BeO;

forcing the plates together such that the disks are compressed with a predetermined pressure;

holding the disks and plates in compressive relationship at the predetermined pressure in a heated environment with a predetermined elevated temperature for a predetermined time period such that the lapping induced stress adjacent to the surfaces of the disks decay to a level such that the distortion of the disks after cooling is essentially zero, and limiting the time-temperature product such that the other desirable metallurgical characteristics of the disks after cooling remain essentially undisturbed;

cooling the disks and plates to essentially room temperature.

2. The process as set forth in claim 1 where the step of obtaining the first plurality of circular disks includes obtaining a cylindrical rod of commercially pure Beryllium, the rod having a longitudinal axis;

separating the rod along the axis into a first plurality of circular disks, each disk having two opposed surfaces.

3. The process as set forth in claim 1 in which the disks comprise no more than about 2% BeO.

4. The process as set forth in claim 1 in which the disks are obtained from Beryllium prepared by sintering beryllium powder.

5. The process as set forth in claim 4 in which the beryllium powder is prepared by crushing.

6. The process as set forth in claim 4 in which the beryllium powder is prepared by atomizing.

7. The process as set forth in claim 1 in which the heat-treatment temperature is between about 650° C. and about 850° C.

8. The process as set forth in claim 1 in which the heat-treatment time is between about 30 minutes and about 4 hours.

9. The process as set forth in claim 1 in which the heat-treatment temperature is less than about 900° C.

10. The process as set forth in claim 1 in which the plurality of disks numbers between one and less than about 80.

11. A high performance rigid disk substrate prepared in accordance with the method of claim 1.

12. A rigid disk substrate prepared in accordance with the method of claim 1 in which the disk is substantially commercially pure beryllium.

13. A rigid disk substrate prepared in accordance with the method of claim 1 in which the disk contains no more than about 2% BeO.

14. A rigid disk substrate prepared in accordance with the method of claim 1 where the step of obtaining the first plurality of circular disks includes obtaining a cylindrical rod of commercially pure Beryllium having no more than about 2% BeO, the rod having a longitudinal axis;

separating the rod along the axis into a first plurality of circular disks, each disk having two opposed surfaces.

15. A rigid disk substrate prepared in accordance with the method of claim 14 where the step of separating includes a step selected from the group of wire sawing, diamond sawing and super-high-pressure water cutting.

16. A rigid disk substrate prepared in accordance with the method of claim 1 followed by a step of polishing both surfaces of each of the cooled disks to remove enough material to provide a desired surface finish.

17. A rigid disk substrate prepared in accordance with the method of claim 16 followed by a step selected from the group of spray coating, dip coating, spin coating, plating, sputtering, and evaporating.

18. The process as set forth in claim 1 followed by a step of polishing both surfaces of each of the cooled disks to remove enough material to provide a desired surface finish.

19. The process as set forth in claim 18 followed by a step selected from the group of spray coating, dip coating, spin coating, plating, sputtering, and evaporating.

20. A rigid disk Beryllium substrate having a modulus of elasticity of about 4.2 times that of a disk comprised of essentially Aluminum of about the same dimensions.

* * * * *